(12) United States Patent
Chiu

(10) Patent No.: US 11,700,363 B2
(45) Date of Patent: Jul. 11, 2023

(54) STEREOSCOPIC DISPLAY

(71) Applicant: Acer Incorporated, New Taipei (TW)

(72) Inventor: Yi-Jung Chiu, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 17/573,626

(22) Filed: Jan. 11, 2022

(65) Prior Publication Data

US 2022/0394235 A1  Dec. 8, 2022

(30) Foreign Application Priority Data

Jun. 8, 2021 (TW) .................. 110120787

(51) Int. Cl.
*H04N 13/305* (2018.01)
*H04N 13/32* (2018.01)

(52) U.S. Cl.
CPC ........... *H04N 13/305* (2018.05); *H04N 13/32* (2018.05)

(58) Field of Classification Search
USPC .......................................................... 348/51
See application file for complete search history.

(56) References Cited

U.S. PATENT DOCUMENTS

| | | | |
|---|---|---|---|
| 6,329,987 B1 | 12/2001 | Gottfried et al. | |
| 8,750,599 B2 | 6/2014 | Godar | |
| 9,241,155 B2 | 1/2016 | Stamate et al. | |
| 10,582,354 B1* | 3/2020 | Isaac | G08G 1/127 |
| 2003/0016444 A1* | 1/2003 | Brown | H04N 13/305 348/E13.043 |
| 2012/0003434 A1* | 1/2012 | Hiroya | G02B 3/0012 156/64 |
| 2012/0026161 A1* | 2/2012 | Chen | H04N 13/322 345/419 |

FOREIGN PATENT DOCUMENTS

| | | | | |
|---|---|---|---|---|
| CN | 101387756 | | 4/2011 | |
| CN | 107483912 | | 12/2017 | |
| CN | 107608084 A | * | 1/2018 | ............. G02B 27/22 |
| JP | 2001042310 A | * | 2/2001 | ............... G02F 9/00 |
| TW | M528434 | | 9/2016 | |
| TW | 201839462 | | 11/2018 | |
| WO | WO-2020170528 A1 | * | 8/2020 | ........... G09G 3/3426 |

* cited by examiner

Primary Examiner — Behrooz M Senfi
(74) Attorney, Agent, or Firm — JCIPRNET

(57) ABSTRACT

A stereoscopic display, including a display panel and a lenticular plate is provided. The display panel has multiple pixels arranged in an array. The lenticular plate has multiple lenticulars. Each of the lenticulars extends along an extending direction, and the lenticulars are arranged along a periodical direction. The pixels are divided into multiple group. The lenticular plate transmits lights emitted by the pixels of different groups towards multiple different viewing zones, so as to form a stereoscopic vision. In the periodical direction, a pitch of the pixels of the same group is greater than a pitch of the lenticulars.

20 Claims, 5 Drawing Sheets

STEREOSCOPIC DISPLAY

CROSS-REFERENCE TO RELATED APPLICATION

This application claims the priority benefit of Taiwan application serial no. 110120787, filed on Jun. 8, 2021. The entirety of the above-mentioned patent application is hereby incorporated by reference herein and made a part of this specification.

BACKGROUND

Technical Field

The disclosure relates to a display, and more particularly, to a stereoscopic display

Description of Related Art

Stereoscopic displays can be divided into glasses-type stereoscopic displays and naked-eye stereoscopic displays. In the naked-eye stereoscopic displays, parallax barriers or lenticular plates can be used to form multiple viewing zones at different positions in space. The stereoscopic displays provide different images to different viewing zones.

The lenticular plate has multiple lenticulars disposed in parallel. Generally, when viewing a lenticular stereoscopic image, because the image to be viewed is placed under the lenticulars, the plane on which it is placed is also a focal point of the lenticular. Therefore, when viewing the image from the outside of the lens to the inside of the lens, all parallel lines of sight converge on the focal point of the lenticular to view the image under the lenticular. Human eyes view different images because they are in different positions. Therefore, when placing multiple images with different viewing angles under the lenticular plate, the image must be divided into multiple thin strip-shaped images, and then the different images must be merged in sequence.

However, when the human eyes obliquely view the image under the lenticular plate through the lenticular plate at a large angle, it is easy to see other thin strip-shaped images that do not belong to the viewing zone of the eye due to the excessive tilt angle, causing crosstalk.

SUMMARY

The disclosure provides a stereoscopic display, which may effectively improve a crosstalk at a large viewing angle.

An embodiment of the disclosure provides a stereoscopic display including a display panel and a lenticular plate. The display panel has multiple pixels arranged in an array. The lenticular plate has multiple lenticulars. Each of the lenticulars extends along an extending direction, and the lenticulars are arranged along a periodical direction. The pixels are divided into multiple groups. The lenticular plate transmits lights emitted by the pixels of different groups towards multiple different viewing zones, so as to form a stereoscopic vision. In the periodical direction, a pitch of the pixels of the same group is greater than a pitch of the lenticulars.

In the stereoscopic display according to the embodiment of the disclosure, since in the periodical direction of the lenticulars, the pitch of the pixels of the same group is greater than the pitch of the lenticulars, even when the pixels are viewed through the lenticular plate at the large viewing angle, the group of pixels corresponding to the viewing zone of the eye may still be viewed correctly. In this way, the crosstalk at the large viewing angle in the stereoscopic display 100 may be effectively improved.

DETAILED DESCRIPTION OF DISCLOSED EMBODIMENTS

Figure 1:
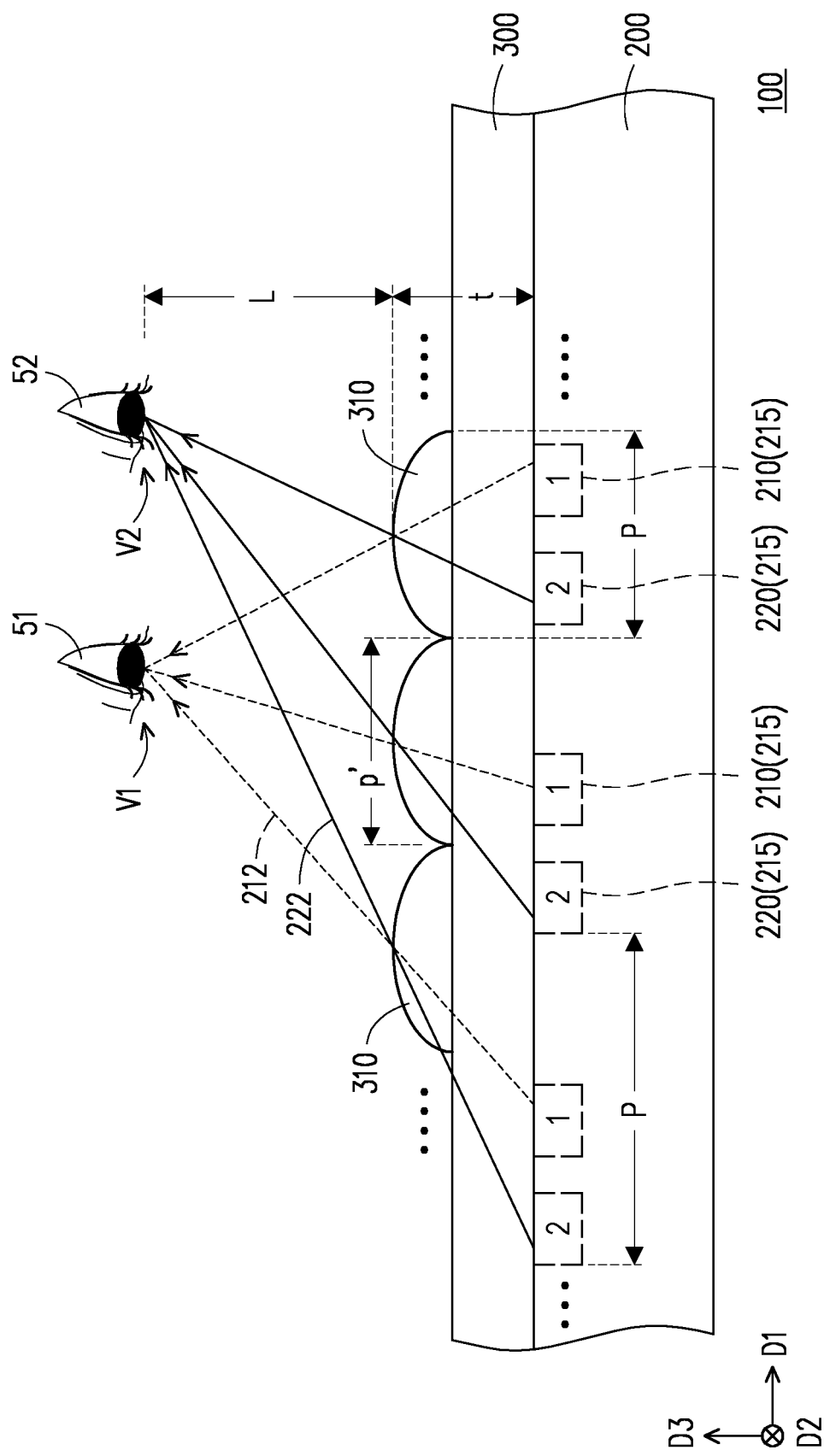
FIG. 1 is a schematic cross-sectional view of a stereoscopic display according to an embodiment of the disclosure.
Figure 2:
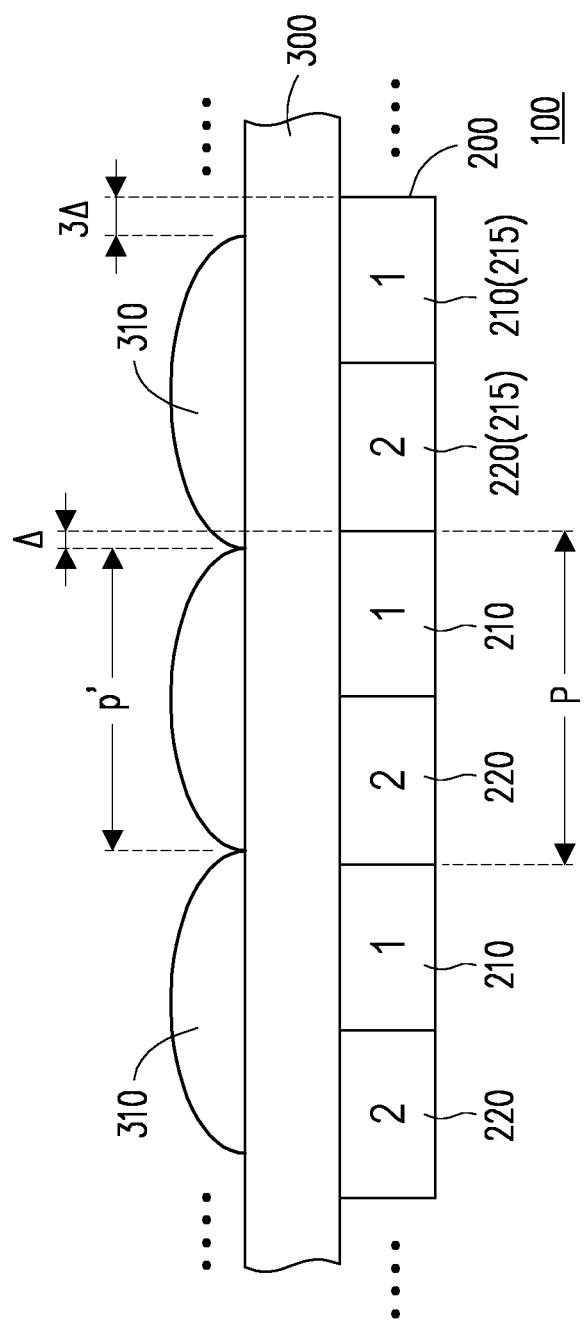
FIG. 2 is a schematic partial cross-sectional view of the stereoscopic display of FIG. 1.

FIG. 1 is a schematic cross-sectional view of a stereoscopic display according to an embodiment of the disclosure. FIG. 2 is a schematic partial cross-sectional view of the stereoscopic display of FIG. 1. Referring to FIGS. 1 and 2, a stereoscopic display 100 of this embodiment includes a display panel 200 and a lenticular plate 300. In this embodiment, the display panel 200 is, for example, a liquid crystal display panel, an organic light emitting diode display panel, a light emitting diode display panel, a micro light emitting diode display panel, an electrophoresis display panel, a plasma display panel, or other suitable display panels. The display panel 200 has multiple pixels 215 arranged in an array. In this embodiment, the pixels 215 are arranged in a rectangular array along a first direction D1 and a second direction D2. The first direction D1 is, for example, a horizontal direction in FIG. 1, and the second direction D2 is a direction perpendicular to a drawing surface. A third direction D3 is, for example, a direction perpendicular to the display panel 200, that is, a vertical direction in FIG. 1.

The lenticular plate 300 has multiple lenticulars 310. Each of the lenticulars 310 extends along an extending direction (for example, the second direction D2 in this embodiment), and the lenticulars 310 are arranged along a periodical direction (for example, the first direction D1 in this embodiment). The lenticular 310 has a curved convex surface in the periodical direction, and a linear shape in the extending direction.

The pixels 215 are divided into multiple groups. In this embodiment, for example, the pixels 215 are divided into two groups, such as a group numbered 210 and a group numbered 220. In order to make it easier for readers to read, simplified numbers 1 and 2 are also provided to mark the two groups of pixels in sequence. The lenticular plate 300 transmits lights 212 and 222 emitted by the pixels 210 and 220 of different groups towards multiple different viewing zones V1 and V2, so as to form a stereoscopic vision. In this embodiment, a focal point of the lenticular 310 is, for example, located on the pixel 215. In the periodical direction (for example, the first direction D1 in this embodiment), a pitch P of the pixels of the same group is greater than a pitch p' of the lenticulars 310. A left eye 51 of a user is, for example, located in the viewing zone V1, and a right eye 52 is, for example, located in the viewing zone V2, so that the left eye 51 may see an image displayed by the group of pixels 210, and the right eye 52 may see an image displayed by another group of pixels 220. When the two groups of pixels 210 and 220 respectively display the images with parallax, the user may perceive and view a stereoscopic image. In this embodiment, the extending direction (i.e., the second direction D2) of the lenticulars 310 is perpendicular to the periodical direction (i.e., the first direction D1), and the periodical direction is parallel to a direction (i.e., the first direction D1) in which the groups of pixels 210 and 220 are alternately arranged.

In the stereoscopic display 100 of this embodiment, since in the periodical direction of the lenticulars 310, the pitch P of the pixels 215 of the same group is greater than the pitch p' of the lenticulars 310, even when the pixels 215 are viewed through the lenticular plate 300 at a large viewing angle, the group of pixels 215 corresponding to the viewing zones V1 or V2 of the eye may still be viewed correctly. In this way, a crosstalk at the large viewing angle in the stereoscopic display 100 may be effectively improved.

In this embodiment, the stereoscopic display 100 conforms to p'=LP/(L+t), where p' is the pitch of the lenticulars 310 in the periodical direction. P is the pitch of the pixels 215 of the same group. L is a distance from the lenticular plate 300 to the viewing zones V1 and V2, and t is a thickness of the lenticular plate 300. In addition, referring to FIG. 2, in this embodiment, in the periodical direction, the pixels 215 of 2N−1 periods counted from a center towards both sides all protrude by a distance of (2N−1)Δ at a single side relative to the 2N−1 lenticulars 310. N is a positive integer, and Δ=(P−p')/2. For example, when N=1, that is, the pixels 210 and 220 of one period in the center all protrude by a distance of Δ at the single side relative to the one lenticular 310 in the center (as shown in FIG. 2). When N=2, the pixels 210 and 220 of three periods in the center all protrude by a distance of 3Δ at the single side relative to the three lenticulars in the center. When N=3, it is derived by analogy. In this way, even when the eyes of the user view the pixels 215 through the lenticular plate 300 at the large viewing angle, the pixels 215 corresponding to the viewing zone of the eye may still be viewed correctly, which effectively improves the crosstalk.

Figure 3A:
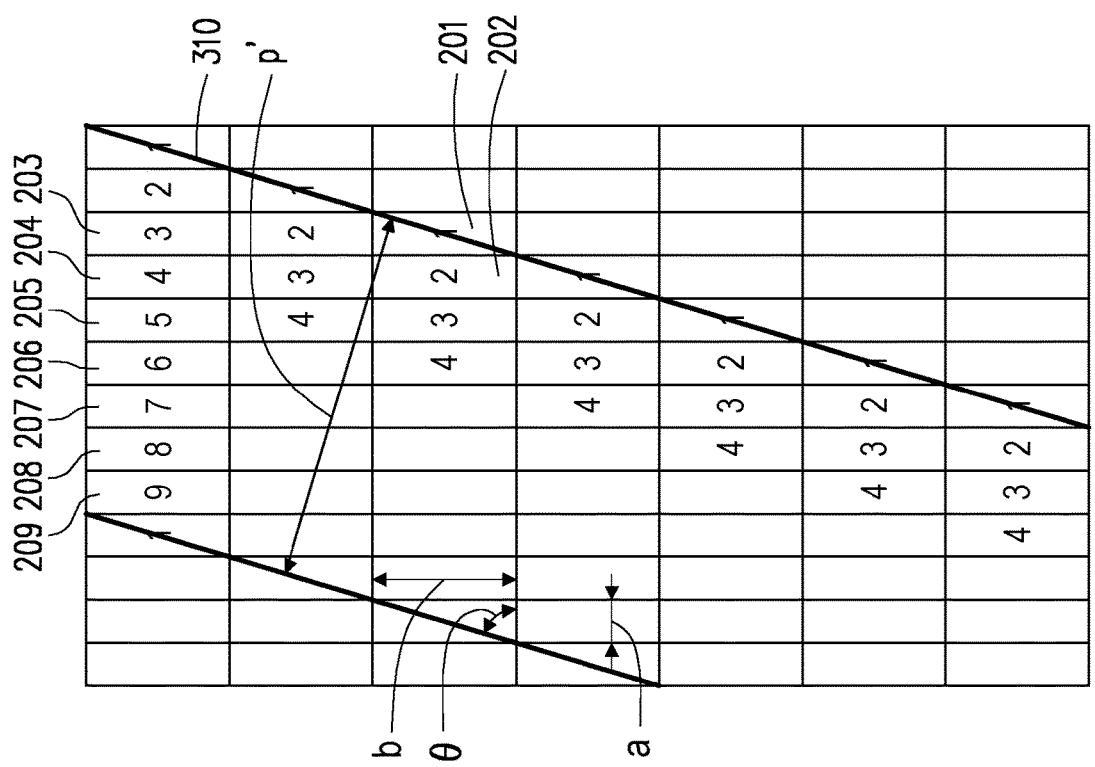
FIG. 3A is a schematic partial cross-sectional view of a stereoscopic display according to an embodiment of the disclosure.
Figure 3A:
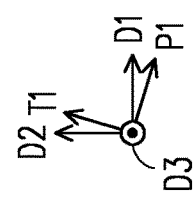
Figure 3B:
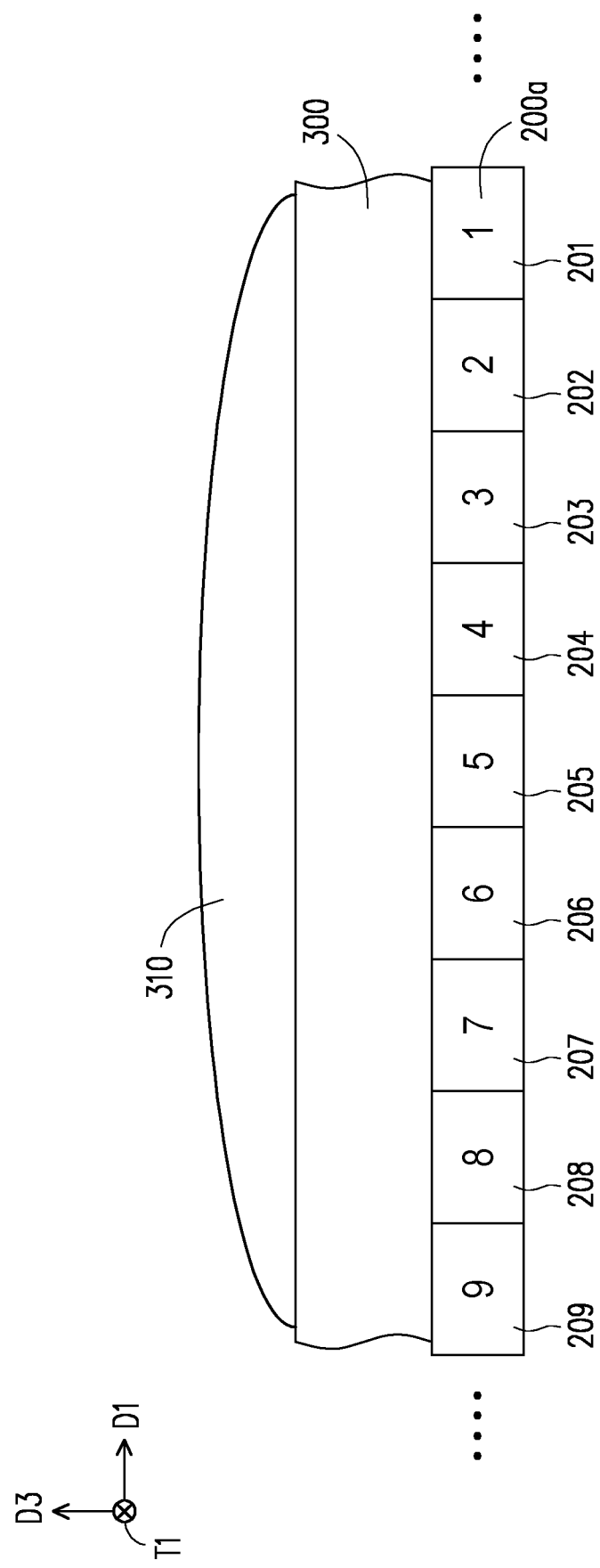
FIG. 3B is a schematic cross-sectional view of the stereoscopic display of FIG. 3A along a pitch p'.
Figure 4:
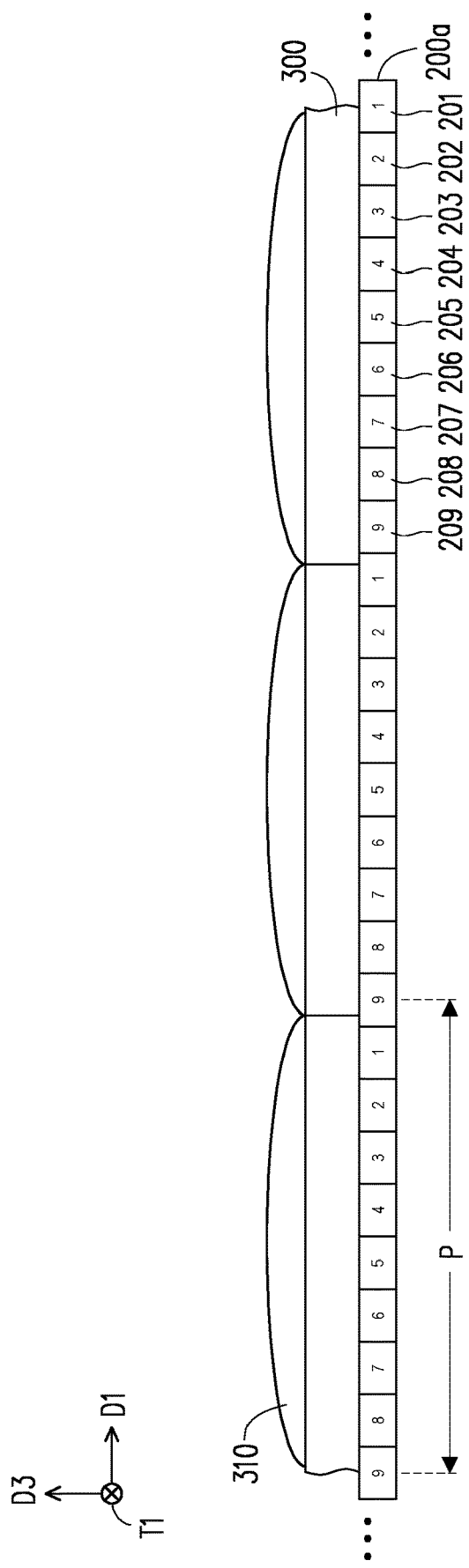
FIG. 4 is a schematic partial cross-sectional view of the stereoscopic display of FIG. 3A along a direction of the pitch p'.

FIG. 3A is a schematic partial cross-sectional view of a stereoscopic display according to an embodiment of the disclosure. FIG. 3B is a schematic cross-sectional view of the stereoscopic display of FIG. 3A along a pitch p'. FIG. 4 is a schematic partial cross-sectional view of the stereoscopic display of FIG. 3A along a direction of the pitch p'. Referring to FIGS. 3A, 3B, and 4, in this embodiment, an extending direction T1 of the lenticulars 310 is perpendicular to a periodical direction P1, and the periodical direction P1 is inclined relative to a direction (i.e., the first direction D1) in which multiple groups of pixels 201 to 209 are alternately arranged. In this embodiment, the groups of pixels may be divided into nine groups with numbers ranging from 201 to 209. In order to make it easier for readers to read, simplified numbers 1 to 9 are also provided to mark the nine groups of pixels in sequence. If a width of the pixel is a, while a length is b, and an included angle between the extending direction T1 and the first direction D1 is θ, the pitch P of the pixels of the same group is K×a× cos(tan−1(1/b)), where K is a grouping number of the pixels. In this embodiment, K is, for example, 9.

Even if the lenticulars 310 are disposed obliquely relative to the pixels, in the periodical direction P1, the pitch P of the pixels of the same group is greater than the pitch p' of the lenticulars 310, and the crosstalk at the large viewing angle may be improved as in the embodiment of FIG. 1. In an embodiment, the stereoscopic display of this embodiment also conforms to p'=LP/(L+t).

Based on the above, in the stereoscopic display according to the embodiment of the disclosure, since in the periodical direction of the lenticulars, the pitch of the pixels of the same group is greater than the pitch of the lenticulars, even when the pixels are viewed through the lenticular plate at the large viewing angle, the group of pixels corresponding to the viewing zone of the eye may still be viewed correctly. In this way, the crosstalk at the large viewing angle in the stereoscopic display 100 may be effectively improved.

What is claimed is:

1. A stereoscopic display, comprising:
a display panel having a plurality of pixels arranged in an array; and
a lenticular plate having a plurality of lenticulars, wherein each of the lenticulars extends along an extending direction, the lenticulars are arranged along a periodical direction, the pixels are divided into a plurality of groups, and the lenticular plate transmits lights emitted by the pixels of different groups towards a plurality of different viewing zones, so as to form a stereoscopic vision;
wherein in the periodical direction, a pitch of the pixels of a same group is greater than a pitch of the lenticulars, and the stereoscopic display conforms to p'=LP/(L+t), wherein p' is the pitch of the lenticulars in the periodical direction, P is the pitch of the pixels of the same group, L is a distance from the lenticular plate to the viewing zones, and t is a thickness of the lenticular plate.

2. The stereoscopic display according to claim 1, wherein the extending direction is perpendicular to the periodical direction, and the periodical direction is parallel to a direction in which the groups of pixels are alternately arranged.

3. The stereoscopic display according to claim 1, wherein the extending direction is perpendicular to the periodical direction, and the periodical direction is inclined relative to a direction in which the groups of pixels are alternately arranged.

4. The stereoscopic display according to claim 1, wherein in the periodical direction, the pixels of 2N−1 periods counted from a center towards both sides all protrude by a distance of (2N−1)Δ at a single side relative to the 2N−1 lenticulars, N is a positive integer, and Δ=(P−p')/2.

5. The stereoscopic display according to claim 1, wherein the display panel is a liquid crystal display panel, an organic light emitting diode display panel, a light emitting diode display panel, a micro light emitting diode display panel, an electrophoretic display panel, or a plasma display panel.

6. The stereoscopic display according to claim 1, wherein the pixels are arranged in a rectangular array.

7. The stereoscopic display according to claim 6, wherein the pixels are arranged along a first direction and a second direction parallel to the display panel.

8. The stereoscopic display according to claim 7, wherein the first direction is perpendicular to the second direction.

9. The stereoscopic display according to claim 1, wherein each of the lenticulars has a curved convex surface in the periodical direction, and a linear shape in the extending direction.

10. The stereoscopic display according to claim 1, wherein focal points of the lenticulars are located on the pixels.

11. The stereoscopic display according to claim 1, wherein the pixels of different groups respectively display the images with parallax.

12. A stereoscopic display, comprising:
a display panel having a plurality of pixels arranged in an array; and
a lenticular plate having a plurality of lenticulars, wherein each of the lenticulars extends along an extending direction, the lenticulars are arranged along a periodical direction, the pixels are divided into a plurality of groups, and the lenticular plate transmits lights emitted by the pixels of different groups towards a plurality of different viewing zones, so as to form a stereoscopic vision;
wherein in the periodical direction, a pitch of the pixels of a same group is greater than a pitch of the lenticulars, and
wherein in the periodical direction, the pixels of 2N−1 periods counted from a center towards both sides all protrude by a distance of $(2N-1)\Delta$ at a single side relative to the 2N−1 lenticulars, N is a positive integer, and $\Delta=(P-p')/2$, wherein $p'$ is the pitch of the lenticulars in the periodical direction, and P is the pitch of the pixels of the same group.

13. The stereoscopic display according to claim 12, wherein the extending direction is perpendicular to the periodical direction, and the periodical direction is parallel to a direction in which the groups of pixels are alternately arranged.

14. The stereoscopic display according to claim 12, wherein the extending direction is perpendicular to the periodical direction, and the periodical direction is inclined relative to a direction in which the groups of pixels are alternately arranged.

15. The stereoscopic display according to claim 12, wherein the display panel is a liquid crystal display panel, an organic light emitting diode display panel, a light emitting diode display panel, a micro light emitting diode display panel, an electrophoretic display panel, or a plasma display panel.

16. The stereoscopic display according to claim 12, wherein the pixels are arranged in a rectangular array.

17. The stereoscopic display according to claim 16, wherein the pixels are arranged along a first direction and a second direction parallel to the display panel.

18. The stereoscopic display according to claim 17, wherein the first direction is perpendicular to the second direction.

19. The stereoscopic display according to claim 12, wherein each of the lenticulars has a curved convex surface in the periodical direction, and a linear shape in the extending direction.

20. The stereoscopic display according to claim 12, wherein focal points of the lenticulars are located on the pixels.

* * * * *